United States Patent
Saarakkala et al.

(10) Patent No.: US 11,043,864 B2
(45) Date of Patent: Jun. 22, 2021

(54) SELF-COMMISSIONING OF A BEARINGLESS-MOTOR DRIVE

(71) Applicant: KONE Corporation, Helsinki (FI)

(72) Inventors: Seppo Saarakkala, Helsinki (FI); Victor Mukherjee, Helsinki (FI); Maksim Sokolov, Helsinki (FI); Marko Hinkkanen, Helsinki (FI); Anouar Belahcen, Helsinki (FI)

(73) Assignee: KONE CORPORATION, Helsinki (FI)

( * ) Notice: Subject to any disclaimer, the term of this patent is extended or adjusted under 35 U.S.C. 154(b) by 189 days.

(21) Appl. No.: 16/540,263

(22) Filed: Aug. 14, 2019

(65) Prior Publication Data

US 2020/0076255 A1 Mar. 5, 2020

(30) Foreign Application Priority Data

Sep. 3, 2018 (EP) ..................................... 18192148

(51) Int. Cl.
*H02P 21/14* (2016.01)
*H02K 1/28* (2006.01)
(Continued)

(52) U.S. Cl.
CPC .............. *H02K 1/28* (2013.01); *F16H 61/26* (2013.01); *H02K 21/42* (2013.01);
(Continued)

(58) Field of Classification Search
CPC ............. H02P 21/0017; H02P 21/0021; H02P 21/0025; H02P 21/14; H02P 21/141;
(Continued)

(56) References Cited

U.S. PATENT DOCUMENTS

2015/0002071 A1  1/2015  Wang et al.

FOREIGN PATENT DOCUMENTS

| CN | 108054973 A | 5/2018 |
| EP | 1 158 658 A2 | 11/2001 |
| EP | 2 131 488 A1 | 12/2009 |

OTHER PUBLICATIONS

European Search Report, issued in Priority Application No. 18192148.7, dated Mar. 6, 2019.

(Continued)

*Primary Examiner* — Ramon M Barrera
(74) *Attorney, Agent, or Firm* — Birch, Stewart, Kolasch & Birch LLP

(57) ABSTRACT

A method and apparatus for self-commissioning a bearingless-motor drive, which includes a bearingless motor and a control unit of the bearingless motor are disclosed. The motor includes at least one winding and at least one permanent magnet. The method includes generating a magnetic model, the magnetic model including a plurality of constant parameters; supplying, while the movable part remains standstill, to the at least one winding at least two unequal currents; measuring, with a magnetic sensor, flux linkages caused by said at least two unequal currents, respectively; calculating, with the magnetic model, flux linkages by inputting to the magnetic model current values equal to the currents supplied to the at least one winding; and fitting, with a least-squares fitting algorithm, at least one constant parameter in the magnetic model such that the difference between the measured and calculated flux linkages will be minimized.

20 Claims, 5 Drawing Sheets

(51) Int. Cl.
  *H02K 21/42*   (2006.01)
  *F16H 61/26*   (2006.01)
  *H02P 23/00*   (2016.01)
  *H02P 21/00*   (2016.01)
  *H02P 25/026*  (2016.01)
  *F16H 61/28*   (2006.01)

(52) U.S. Cl.
  CPC ...... *H02P 21/0025* (2013.01); *H02P 23/0031* (2013.01); *H02P 25/026* (2013.01); *F16H 2061/2853* (2013.01)

(58) Field of Classification Search
  CPC .......... H02P 21/16; H02P 21/26; H02P 23/00; H02P 23/0031; H02P 25/026
  See application file for complete search history.

(56) References Cited

OTHER PUBLICATIONS

Marouani et al., "Observation and Measurement of Magnetic Flux in a Dual Star Induction Machine", 19th Mediterranean Conference on Control and Automation, Jun. 20-23, 2011, XP031927952, pp. 289-294.

SELF-COMMISSIONING OF A BEARINGLESS-MOTOR DRIVE

BACKGROUND OF THE INVENTION

The present invention relates to solutions for self-commissioning bearingless-motor drives. The bearingless-motor drives integrate the functionalities of active magnetic bearings and electrical machine into a single unit.

The bearingless-motor drive contains a bearingless motor and a control unit of the motor, such as a frequency converter.

The bearingless motor may be a linear motor or a rotating motor. In case of a linear bearingless motor, the motor has a mover which comprises the active components of the electric motor e.g. windings and permanent magnets. The mover is adapted to travel along a stator rail, which comprises ferromagnetic poles. In case of a rotating bearingless motor, the motor has a stator which comprises the windings and possible permanent magnets. Rotor of the rotating bearingless motor comprises the ferromagnetic poles.

Operation of the bearingless motor is based on levitation. During levitation, radial forces are provided by supplying current to the motor windings to maintain separation between mover and stator rail (in case of a linear motor) or stator and rotor (in case of a rotating motor).

Control of bearingless-motor drives is based on active levitation control, which is performed in tandem with drive torque control. In many applications, such as in elevators, escalators, manufacturing robots, conveyors etc., good performance characteristics are required from the bearingless-motor drives. Thus, there is a need to further develop control models which enable improved performance charasteristics of the bearingless-motor drives.

SUMMARY OF THE INVENTION

The objective of the invention is to solve at least one of the above-identified problems. The invention discloses a method, a control unit and a bearingless-motor drive for self-commissioning routine of bearingless-motor drives. The routine enables self-commissioning of the motor drive without need to operate the motor in an active closed-loop levitation control, allowing the self-commissioning during initiation of the motor drive, while the moving part remains standstill, e.g. the rotor (in case of a rotating motor) is resting on safety bearings or mover (in case of a linear motor) is initially attached to the stator rail.

First aspect of the invention is a method for self-commissioning a bearingless-motor drive, which includes a bearingless motor and a control unit of the bearingless motor. The bearingless motor includes a stationary part and a movable part adapted to move relative to the stationary part. The bearingless motor includes at least one winding. The method comprises: generating a magnetic model, which represents a relationship between current, ($i_d$, $i_q$), air gap length (Y) and flux linkage ($\psi_d$, $\psi_q$) of the bearingless motor, the magnetic model (43) comprising plurality of constant parameters ($a_{d0}$, $a_{dd}$, $a_{dq}$, $a_{q0}$, $a_{qq}$, $a_{dq}$, $b_{dm}$, $b_d$, $b_q$, $c_o$, $f_o$, $\psi_r$, S, T, U, V), supplying, while the movable part remains standstill, to the at least one winding at least two unequal currents ($i_{dexc}$, $i_{qexc}$), and measuring, by means of a magnetic sensor, flux linkages ($\psi_{dmeas}$, $\psi_{qmeas}$) caused by said at least two unequal currents ($i_{dexc}$, $i_{qexc}$), respectively. The method further comprises calculating, by means of the magnetic model 43, flux linkages ($\psi_d$, $\psi_q$) by inputting to the magnetic model current values ($i_d$, $i_q$) equal to the currents ($i_{dexc}$, $i_{qexc}$) supplied to the at least one winding, and fitting, by means of a least-squares fitting algorithm, at least one constant parameter ($a_{d0}$, $a_{dd}$, $a_{dq}$, $a_{q0}$, $a_{qq}$, $a_{dq}$, $b_{dm}$, $b_d$, $b_q$, $c_o$, $f_o$, $\psi_r$, S, T, U, V) in the magnetic model such that the difference between the measured ($\psi_{dmeas}$, $\psi_{qmeas}$) and calculated ($\psi_d$, $\psi_q$) flux linkages will be minimized.

Second aspect of the invention is a method for condition monitoring of a bearingless-motor drive. The method comprises: generating a magnetic model, which represents a relationship between current, ($i_d$, $i_q$), air gap length (Y) and flux linkage ($\psi_d$, $\psi_q$) of the bearingless motor, the magnetic model comprising plurality of constant parameters ($a_{d0}$, $a_{dd}$, $a_{dq}$, $a_{q0}$, $a_{qq}$, $a_{dq}$, $b_{dm}$, $b_d$, $b_q$, $c_o$, $f_o$, $\psi_r$, S, T, U, V), and memorizing said plurality of constant parameters. The method further comprises: supplying, to the at least one winding at least two unequal currents ($i_{dexc}$, $i_{qexc}$), and measuring, by means of a magnetic sensor, flux linkages ($\psi_{dmeas}$, $\psi_{qmeas}$) caused by said at least two unequal currents ($i_{dexc}$, $i_{qexc}$), respectively. The method further comprises: calculating, by means of the magnetic model (43), flux linkages ($\psi_d$, $\psi_q$) by inputting to the magnetic model (43) current values ($i_d$, $i_q$) equal to the currents ($i_{dexc}$, $i_{qexc}$) supplied to the at least one winding, fitting, by means of a least-squares fitting algorithm, at least constant parameter ($a_{d0}$, $a_{dd}$, $a_{dq}$, $a_{q0}$, $a_{qq}$, $a_{dq}$, $b_{dm}$, $b_d$, $b_q$, $c_o$, $f_o$, $\psi_r$, S, T, U, V) in the magnetic model such that the difference between the measured ($\psi_{dmeas}$, $\psi_{qmeas}$) and calculated ($\psi_d$, $\psi_q$) flux linkages will be minimized comparing the at least one constant parameter resulting from the fitting to the corresponding memorized constant parameter, and establishing a service request of the bearingless-motor drive based on the comparison.

Third aspect of the invention is a control unit for a bearingless-motor drive, wherein the control unit comprises or can be connected to at least one current sensor and at least one magnetic sensor, and wherein the control unit is operable to feed current to the at least one winding of the bearingless motor, and wherein the control unit comprises a processor and a memory including instructions which, when executed in the processor, cause the control unit to perform a method according to first or second aspect of the invention.

Fourth aspect of the invention is a bearingless-motor drive, which includes a bearingless motor and a control unit of the bearingless motor, wherein the bearingless motor includes a stationary part and a movable part adapted to move relative to the stationary part, the motor including at least one winding and at least one permanent magnet. The bearingless-motor drive includes at least one current sensor and at least one magnetic sensor, which are connected to the control unit. The control unit is adapted to feed current to the at least one winding of the bearingless motor. The control unit comprises a processor and a memory including instructions which, when executed in the processor, cause the control unit to perform a method according to first or second aspect of the invention.

Fifth aspect of the invention is an elevator comprising a bearingless-motor drive according to the fourth aspect of the invention.

According to a refinement of the first aspect of the invention, a method for self-commissioning a bearingless-motor drive is disclosed. The bearingless-motor drive includes a bearingless motor and a control unit of the bearingless motor. The bearingless motor includes a stationary part and a movable part adapted to move relative to the stationary part. The bearingless motor includes at least one winding. The method comprises: generating a magnetic model, which represents in a d, q coordinate system of the movable part a relationship between d-axis ($i_d$) and q-axis ($i_q$) current components, air gap length (Y) and d-axis ($\psi_d$) and q-axis ($\psi_q$) flux linkage components of the bearingless motor, the magnetic model comprising plurality of constant parameters ($a_{d0}$, $a_{dd}$, $a_{dq}$, $a_{q0}$, $a_{qq}$, $a_{dq}$, $b_{dm}$, $b_d$, $b_q$, $c_o$, $f_o$, $\psi_r$, S, T, U, V), supplying, while the movable part remains standstill, to the at least one winding at least two unequal d-axis current components ($i_{dexc}$) and/or at least two unequal q-axis current ($i_{qexc}$) components, and measuring, by means of a magnetic sensor, d-axis ($\psi_{dmeas}$) and q-axis ($\psi_{qmeas}$) flux linkage components caused by said d-axis and q-axis current components ($i_{dexc}$, $i_{qexc}$), respectively. The method further comprises calculating, by means of the magnetic model, d-axis ($\psi_d$) and q-axis ($\psi_q$) flux linkage components by inputting to the magnetic model d-axis ($i_d$) and q-axis current ($i_q$) component values equal to the d-axis ($i_{dexc}$) and q-axis current ($i_{qexc}$) components supplied to the at least one winding, and fitting, by means of a least-squares fitting algorithm, at least one constant parameter ($a_{d0}$, $a_{dd}$, $a_{dq}$, $a_{q0}$, $a_{qq}$, $a_{dq}$, $b_{dm}$, $b_d$, $b_q$, $c_o$, $f_o$, $\psi_r$, S, T, U, V) in the magnetic model such that the difference between the measured ($\psi_{dmeas}$, $\psi_{qmeas}$) and calculated ($\psi_d$, $\psi_q$) d-axis and q-axis flux linkage components will be minimized.

According to a preferred embodiment, the number of the unequal currents ($i_{dexc}$, $i_{qexc}$) supplied to the at least one winding is higher than the number of the constant parameters ($a_{d0}$, $a_{dd}$, $a^{dq}$, $a_{q0}$, $a_{qq}$, $a_{dq}$, $b_{dm}$, $b_d$, $b_q$, $c_o$, $f_o$, $\psi_r$, S, T, U, V) to be fitted in the magnetic model.

According to a preferred embodiment, the bearingless motor includes at least one winding and at least one permanent magnet.

According to a preferred embodiment, the bearingless motor is a stator-mounted permanent magnet motor (SMPM) wherein permanent magnet(s) and winding(s) is/are mounted to the mover (in case of a linear motor) or to the stator (in case of a rotating motor). One suitable motor type is a flux-switching permanent magnet (FSPM) motor. Other suitable motor types may be, for example, doubly salient permanent magnet (DSPM) motor and flux reversal permanent magnet (FRPM) motor.

In an alternative embodiment motor may be a hybrid excitation (HE) synchronous machine.

In the preceding disclosure as well as in the claims, it has been disclosed to feed currents to the at least one winding of the bearingless motor and to fit at least one constant parameter of the magnetic model by minimizing difference between measured and calculated flux linkages by means of a least-squares fitting algorithm. An equivalent solution to this would be to feed magnetic flux linkages to the bearingless motor and to fit, by means of a least-square fitting algorithm, at least one constant parameter of the magnetic model by minimizing difference between currents measured from the at least one winding and currents calculated from the magnetic model (by inputting to the magnetic model magnetic flux linkages equal to those fed to the motor). This equivalent solution is therefore understood to be included in the scope of protection of the current invention.

BRIEF DESCRIPTION OF THE DRAWINGS

The invention is now described hereinafter with respect to the enclosed drawing. In this drawing

DESCRIPTION OF THE PREFERRED EMBODIMENTS

It is emphasized that identical parts or parts with the same functionality are designated by the same reference numbers in all figures.

Figure 1A:
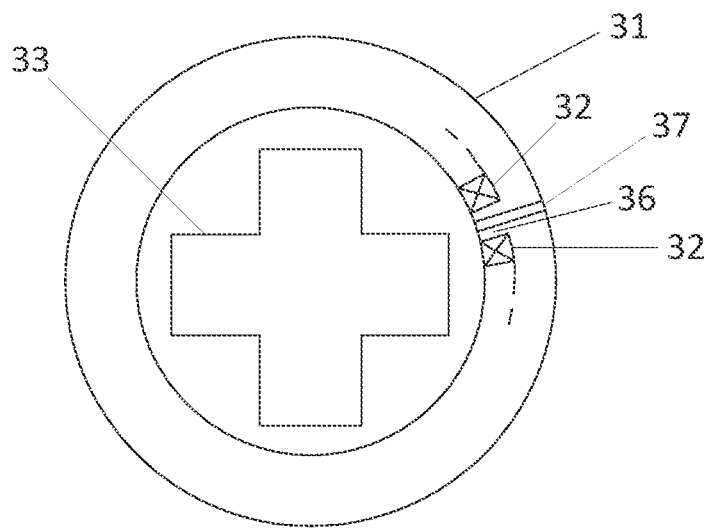
FIG. 1A shows a front view of a rotating bearingless reluctance motor according to an embodiment.
Figure 1B:
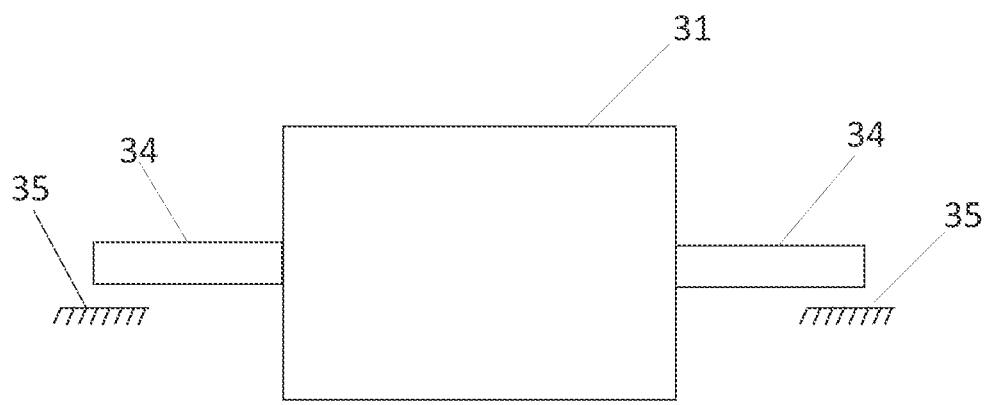
FIG. 1B shows a side view of the rotating bearingless reluctance motor of FIG. 1A.

FIGS. 1A and 1B show a horizontally mounted, rotating synchronous bearingless reluctance motor according to an exemplary embodiment. The motor has a stationary part including stator 31 with stator teeth 36 and windings 32 surrounding the stator teeth 36. Motor has also a movable part including salient 4-pole rotor 33. Rotor 33 is adapted to rotate relative to the stator 31. During operation, rotor 33 is levitating with the radial forces caused by the windings 32. When the motor is started, axis 34 of the rotor is initially resting on the safety bearing 35, meaning that the rotor 33 is radially significantly displaced from the center of the stator 31 (magnetic center position). Thus, in contrary to conventional electric motors, the airgap of the bearingless motor does not remain constant during the operation.

In an alternative embodiment, stator 31 includes windings 32 as well as permanent magnets 37 embedded into the stator iron, preferably into the stator teeth 36.

Figure 2:
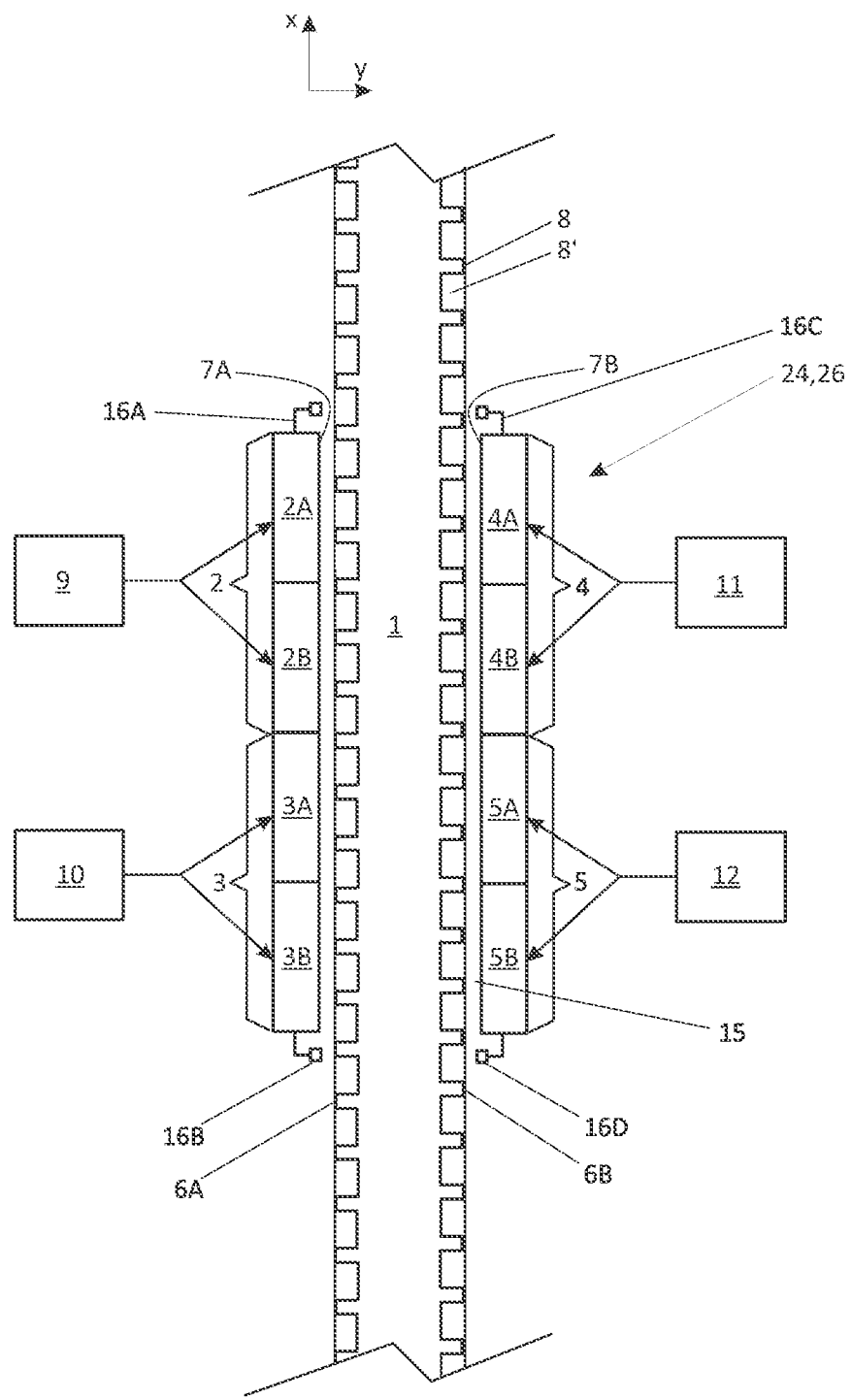
FIG. 2 shows a side view of an electric linear motor according to an embodiment
Figure 3:
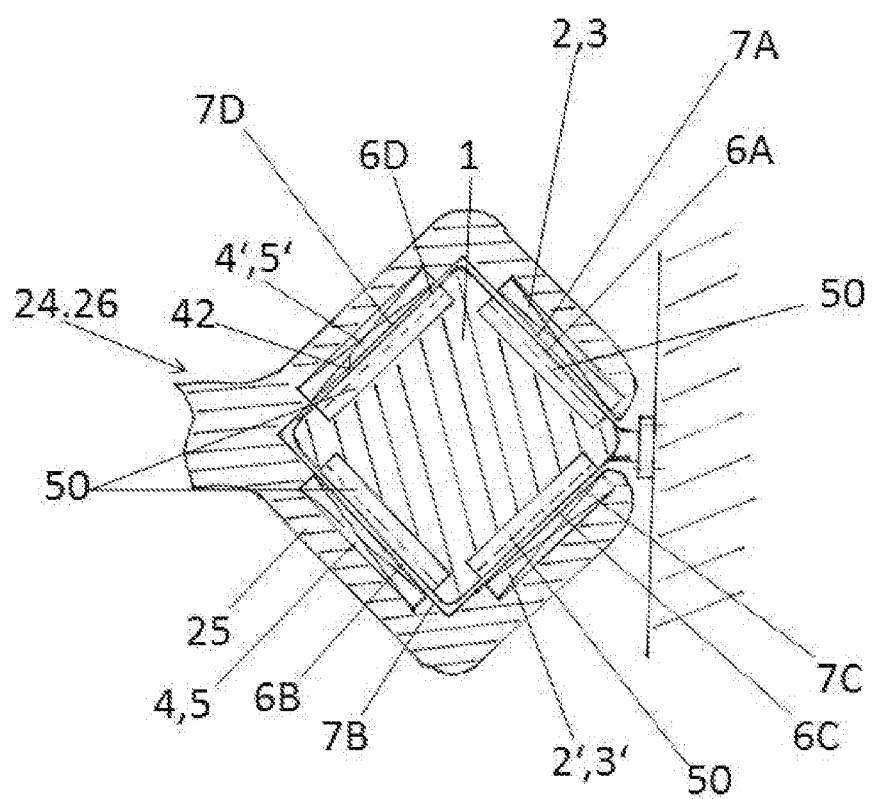
FIG. 3 shows a cross-section through a stator beam and a mover of FIG. 1.

FIGS. 2 and 3 show an electric linear motor according to an exemplary embodiment. shows a side view of an electric linear motor. The linear motor comprises a stationary part, which is a longitudinal stator beam 1 and a movable part, which is a mover 24, 26, which surrounds the stator beam 1. The stator beam 1 has four side faces 6A, 6B, 6C, 6D as illustrated in FIG. 3. The side faces are located two by two at opposite sides of the stator beam 1, such that the four side faces 6A, 6B; 6C, 6D substantially cover circumference of the stator beam 1. Each of the side faces carries ferromagnetic poles 8, i.e. ferromagnetic teeth, spaced apart by a pitch 8', e.g. a gap or slot between the teeth 8. Only two of the four opposite side faces 6A, 6B, as well as the respective counterfaces 7A, 7B of the motor, are illustrated in FIG. 2.

The mover 24, 26 comprises four counter-faces 7A, 7B; 7C, 7D facing the respective side faces 6A, 6B; 6C, 6D of the stator beam 1.

Figure 4:
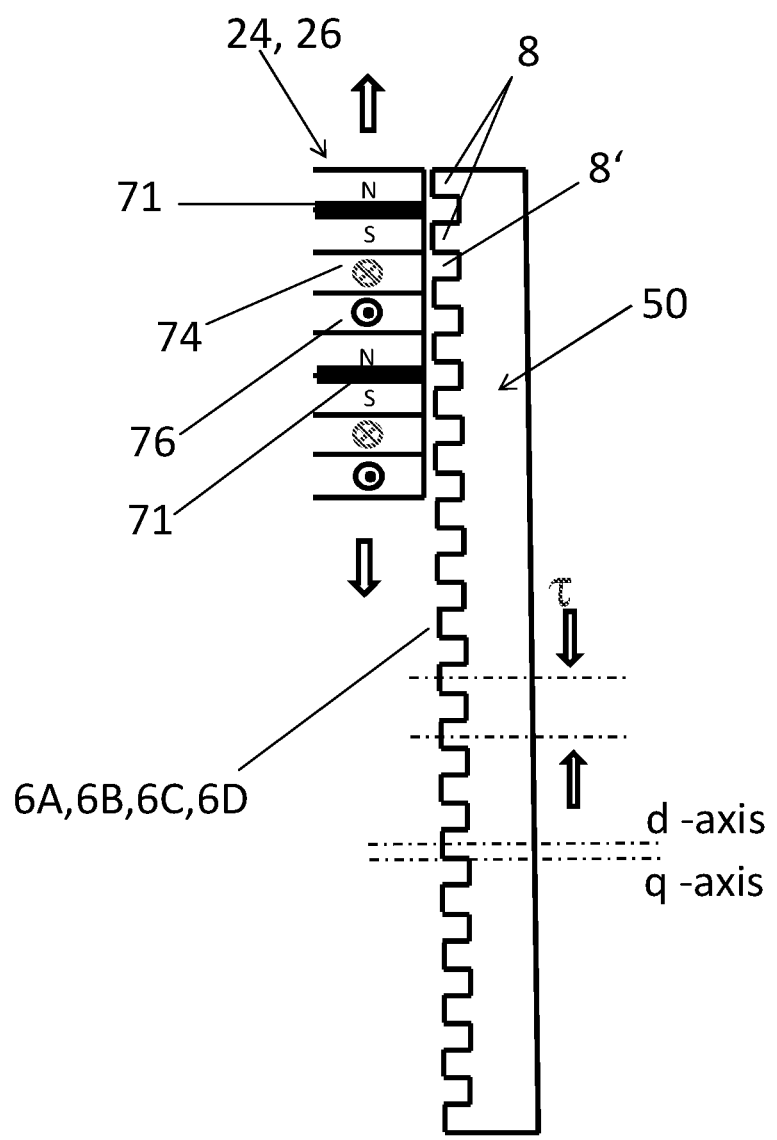
FIG. 4 shows a schematic drawing of the function of a switching permanent magnet motor (FSPM) according to an embodiment.

The mover has in each of said counter-faces 7A, 7B; 7C, 7D rotor units 2,3,4,5; 2', 3', 4', 5'. The motor may be a flux-switching permanent magnet motor as depicted in FIG. 4. All the permanent magnets and three-phase motor windings are in the rotor units 2, 3, 4, 5. 3. In the embodiment of FIG. 4, the ferromagnetic poles 8 are teeth provided on a side face 6A, 6B; 6C, 6D of a ferromagnetic stator rod 50, which stator rod 50 is embedded into respective side-face of the stator beam.

The stator side of the motor is very simple, as the side-faces 6A, 6B; 6C, 6D of the stator beam carrying ferromagnetic poles 8 do not have any permanent magnets as well as no windings either. This simplicity is cumulative when the stator beam 1 becomes long to extend moving range of the mover 24, 26. When mover 24, 26 travels along the stator beam 1, there is an air gap 15 between the side faces 6A, 6B, 6C, 6D and the counter-faces 7A, 7B, 7C, 7D.

This air gap 15 is maintained in a noncontact manner with levitation. The windings 74, 76 and permanent magnets 71 of the rotor units are arranged to co-act with the ferromagnetic poles 8 of the respective side faces 6A, 6B; 6C, 6D of the stator beam 1 to generate force components needed to levitate and drive the mover 24, 26 along the trajectory defined by the stator beam 1.

The mover frame 25 may be made of any suitable rigid, preferably light-weight material, such as glassfiber composite, carbon fibre composite, aluminium or a combination of them.

As FIG. 2 shows, the mover 24, 26 has in each counterface 7A, 7B two rotor units 2, 3; 4, 5 arranged consecutively in the travelling direction, which is parallel to direction x in FIG. 2. Two consecutive, rotor units are needed to straighten tilt of air gap 15. Each rotor unit is supplied with its own inverter 9, 10, 11, 12. To achieve uniform force distribution, each rotor unit has two (or even more than two) commonly controlled rotors 2A, 2B; 3A, 3B; 4A, 4B; 5A, 5B with windings. To achieve common control, windings of the different rotors of same rotor unit are connected in series or in parallel to be supplied with the same inverter 9, 10, 11, 12.

Figure 5:
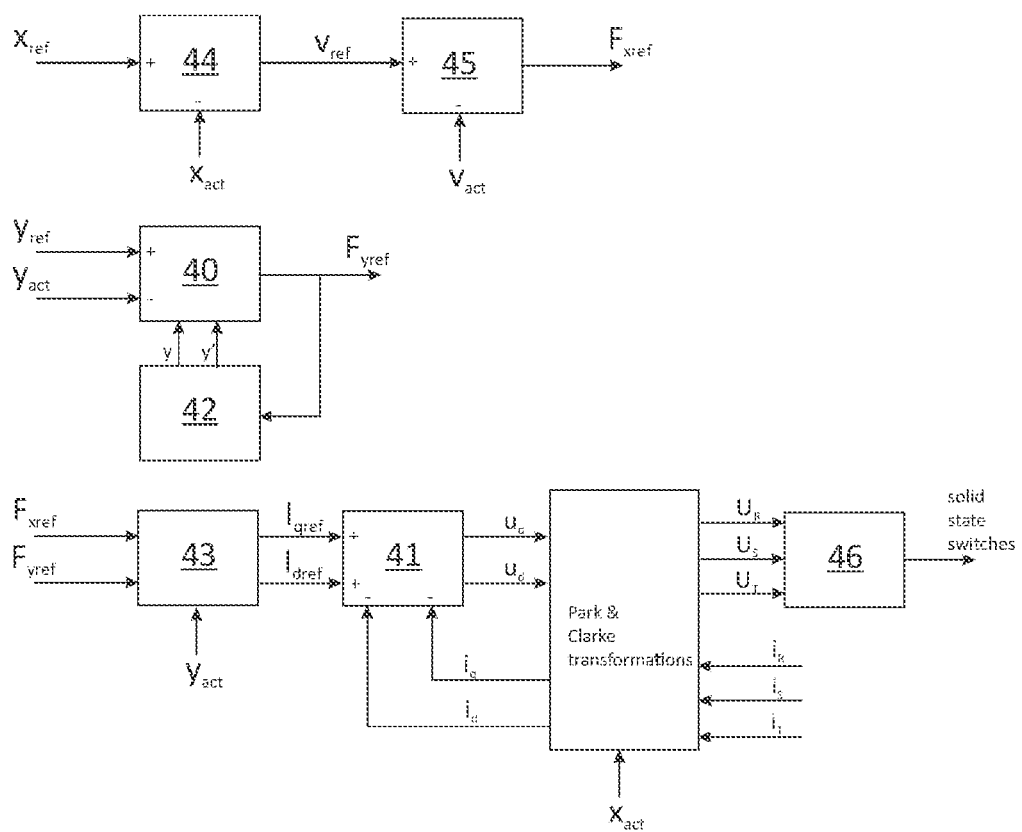
FIG. 5 illustrates schematically the control system according to an embodiment

FIG. 5 depicts a control architecture used to control levitation and travel of the linear motor of FIG. 2. The control architecture shows control elements which are implemented in the control software of the processing units of each inverter 9, 10, 11, 12.

According to FIG. 5, each inverter 9, 10, 11, 12 receives position information $X_{act}$ of the mutual position of the three-phase windings of the rotor unit controlled with corresponding inverter, and the ferromagnetic poles facing/co-acting with said three-phase windings. The mutual position $X_{act}$ is measured in the travelling direction, parallel to direction x in FIG. 2, by means of one or more position sensors 16A, 16B, 16C, 16D, which are magnetic sensors in the form of hall sensors. Each inverter 9, 10, 11, 12 controls current supply of the rotor windings in a d, q-coordinate system of its own. The d, q coordinate system is synchronized by means of the position information $X_{act}$ to the position of ferromagnetic poles of the stator beam facing the rotor windings. The d-axis is referenced to the direction of the ferromagnetic poles 8 such that it is in the direction of the center line of the co-acting ferromagnetic pole. This direction may be the same as center line of the stator teeth (see FIG. 4); on the other hand it may also differ from that, e.g. due to saturation of the stator teeth. d-axis direction may also be defined otherwise: for example, to be in position wherein flux linkage of R-phase of the rotor unit has its maximum.

Each inverter 9, 10, 11, 12 receives also information of length of air gap ($Y_{act}$) between side-face 6A, 6B carrying the ferromagnetic poles 8 and the counterface 7A, 7B containing the rotor unit 2, 3, 4, 5. Air gap length information ($Y_{act}$) may be received from sensors 16A, 16B, 16C, 16D or, additionally or alternatively, from separate air gap sensors, such as eddy current sensors, which may be disposed at same locations as sensors 16A, 16B, 16C, 16D or which may replace one or more of the sensors 16A, 16B, 16C, 16D. To measure air gap length as well as air gap tilt in longitudinal direction of stator beam 1, at least two sensors are needed for example at opposite ends at opposite sides of the mover, for example at sensor positions 16A and 16D of FIG. 2.

A reference value for the air gap $Y_{ref}$ is memorized in the processing unit of the inverter 9, 10, 11, 12. Air gap controller 40 calculates a difference between the air gap reference value $Y_{ref}$ and the air gap length information $Y_{act}$ and generates a reference value for the attraction force $F_{yref}$, e.g. the force component parallel to the y-direction of FIG. 2, to adjust the length of air gap $Y_{act}$ towards the reference value $Y_{ref}$. Air gap controller 40 is a state controller which uses observer 42 to obtain simulated position y and velocity y' (in the y-axis direction of FIG. 2) of the mover 24, 26 mass under the effect of the attraction force estimate $F_{yref}$.

In a first embodiment air gap controllers 40 of inverters controlling rotor units at both opposite sides of the stator beam are used to adjust air gap length. In a second alternative embodiment, on one side of the stator beam the reference value for the attraction force $F_{yref}$ is kept constant and air gap controller is used only in connection with rotor units of the other side of the stator beam to adjust attraction force reference value $F_{yref}$. This means the one or more rotor units of one side provide a constant attraction force against which the air gap controllers act at the other side of the stator beam.

Further, at least one of the inverters 9, 10, 11, 12 of a common mover receives travel position information $x_{act}$ and travel speed information $v_{act}$ of the mover. In this connection travel position information $x_{act}$ and travel speed information refers to position/speed information of the mover in the direction parallel to the x-axis direction of FIG. 2. In the current embodiment the same position information $x_{act}$ is used to define mutual position between rotor unit and respective ferromagnetic poles to synchronize d, q-axis of the drive unit/inverter to said ferromagnetic poles 8. This information is also used to control position $x_{act}$/speed $v_{act}$ of the mover along the stator beam 1. In this embodiment the travel position information $x_{act}$ is be received from the one or more sensors 16A, 16B, 16C, 16D but alternatively a separate sensor may be used. The travel speed information $v_{act}$ may be received from a separate speed sensor, such as an encoder or tachometer, or it may be obtained from timely variation of the travel position information $x_{act}$ (e.g. time derivative of the travel position information) which is the case in this embodiment. One of the inverters of a common mover acts as a master which performs position/speed control in the travelling direction of the mover and outputs a propulsion force reference value $F_{xref}$ (i.e. reference force component parallel to the x-axis direction of FIG. 2) to the other inverters 9, 10, 11, 12. Other inverters of the common mover then act as slaves, which do not perform position/speed control but propulsion force control only. If two or more movers are coupled to a common load-receiving means, such as to a common elevator car, it is also possible that only one inverter of only one mover acts as a master and all the other inverters/movers act as slaves to avoid interference of position/speed controllers.

Going back to FIG. 5, processing unit of the master inverter 9, 10, 11, 12 calculates travel position reference value $x_{ref}$ to establish an intended motion profile for the controlled mover(s). Position controller 44 calculates travel speed reference value $v_{ref}$ from the difference between travel position reference $x_{ref}$ and travel position of the mover $x_{act}$ in the travelling direction x of the mover. Speed controller 45 calculates a propulsion force reference value $F_{xref}$ from the difference between the travel speed reference $v_{ref}$ and the travel speed information $v_{act}$.

Propulsion force reference value $F_{xref}$, attraction force reference value $F_{yref}$ and air gap length information $Y_{act}$ are inputted into magnetic model 43, which calculates d-axis and q-axis current reference components $I_{dref}$, $I_{qref}$ for the rotor windings. In case of slave inverters, each slave inverter calculates its own attraction force reference value $F_{yref}$ by means of the air gap length information $Y_{act}$, but receives propulsion force reference value $F_{xref}$ from the master inverter. With these reference values as well as the air gap length information from air gap sensor 16A, 16B slave inverter calculates the d-axis and q-axis current component reference values with the magnetic model 43.

The magnetic model may consist of algorithms, which represent how attraction force and propulsion force of the motor depend on d-axis and q-axis currents as well as air gap length. This representation may be based on the following motor equations:

$$i_d = (a_{d0} - b_{dm}y)(\psi_d - \psi_r) + \left(b_d y + a_{dd}|\psi_d|^S + \frac{a_{dq}}{V+2}|\psi_d|^U|\psi_q|^{V+2}\right)\psi_d \quad (1)$$

$$i_q = \left(a_{qo} + b_q y + a_{qq}|\psi_q|^T + \frac{a_{dq}}{U+2}|\psi_d|^{U+2}|\psi_q|^V\right)\psi_q \quad (2)$$

$$F_x = \frac{3\pi}{\tau}(\psi_d i_q - \psi_q i_d) \quad (3)$$

$$F_y = -\frac{3}{2}[b_d \psi_d^2 + b_q \psi_q^2 - b_{dm}(\psi_d - \psi_r)^2] - \frac{f_\sigma}{(1+c_\sigma y)^2} \quad (4)$$

wherein $i_d$ and $i_q$ represent current components in d, q coordinate system, $a_{d0}$, $a_{dd}$, $a_{dq}$, $a_{q0}$, $a_{qq}$, $a_{dq}$, $b_{dm}$, $b_d$, $b_q$, $c_o$, $F_{94}$, $\psi_r$, S, T, U, V are motor-specific constant parameters. They are derived based on reluctances, which depend on motor geometry. $\psi_d$ and $\psi_q$ are d and q-axis components of the motor flux linkage, $\tau$ is pole pitch of the motor ($2\pi$), y is air gap length between rotor and stator, and $F_x$ is propulsion force reference value and $F_y$ is attraction force reference value.

in view of the above equations, $F_x$ may be represented to be dependent only on magnetic flux linkage and air gap length y:

$$F_x(\psi_d, \psi_q, y)$$

also $F_y$ may be represented to be dependent only on magnetic flux linkage and air gap length y:

$$F_y(\psi_d, \psi_q, y)$$

Thus magnetic flux linkage components $\psi_d$ and $\psi_q$ may be solved by means of the representations (3) and (4) when the (reference) values of propulsion force $F_{xref}$ and attraction force $F_{yref}$ are received from the speed controller 45 and the air gap controller 40. Reference current values $I_{dref}$, $I_{qref}$ may then be calculated with the equations (1) and (2) by means of the solver magnetic flux linkage components $\psi_d$ and $\psi_q$.

Alternatively or additionally, the magnetic model 43 may comprise a table, having d-axis and q-axis current components memorized and indexed by means of propulsion force reference values $F_{xref}$, attraction force reference values $F_{yref}$ and air gap length information $Y_{act}$. To get more accurate values for the d, q-axis current reference components, it is possible to use interpolation between the memorized values of the table. Table values may also be determined with simulation, for example by using Finite Element Method (FEM).

In the magnetic model 43 at least one of d-axis current reference component $I_{dref}$ and q-axis current reference component $I_{qref}$ of the motor windings is changed when a change in at least one of the propulsion force reference value $F_{xref}$, attraction force reference value $F_{yref}$ and air gap length information $Y_{act}$ of the rotor unit 2, 3, 4, 5 takes place. Therefore magnetic model 43 may speed up adaptation of the rotor units and thus the mover to variable operation conditions, making operation of the mover 24, 26 more stable and responsive.

d-axis and q-axis current component reference values $I_{dref}$, $I_{qref}$ are communicated to current controller 41, which calculates d-axis and q-axis voltage references $U_d$, $U_q$ for the windings of the rotor unit based on the difference between d- and q-axis current reference values $I_{dref}$, $I_{qref}$ and measured d-axis and q-axis current components $I_d$, $I_q$. Transformation from d, q coordination system to three phase voltage components $U_R$, $U_S$, $U_T$, as well as transformation from three-phase current measurements $i_R$, $i_S$, $i_T$ to d, q-axis component values $I_d$, $I_q$ takes place with Park and Clarke transformations, which transformations as such are known in the art. For the synchronization of the d, q coordinate system travel position information $X_{act}$ is used as disclosed above.

The three-phase voltage components of the rotor unit $U_R$, $U_S$, $U_T$ are communicated to state vector PWM modulator 46 (pulse width modulator) of the inverter, which creates the control pulses for controlling the solid state switches of the inverter power stage to introduce modulated three-phase voltage components to the windings of the rotor unit. These solid state switches may be, for example, igbt-transistors, mosfet-transistors, silicon carbide transistors and/or gallium nitride transistors.

In an alternative embodiment, an adequate performance level may be achieved with a simplified control architecture, wherein the speed controller 45 of the master inverter outputs directly q-axis current reference components $I_{qref}$ to the slave inverters. Each slave inverter generates d-axis current reference component $I_{dref}$ of its own, by means of the air gap controller 40. These d, q-current reference components $I_{dref}$, $I_{qref}$ are then directly communicated to current controller 41, thus avoiding use of magnetic model 43, i.e. bypassing it. This may reduce processing power needed for levitation/speed control of the mover 24, 26.

Instead of one inverter 9, 10, 11, 12 acting as a master, it is possible to use a separate master control unit which may perform function of at least one of air gap controller 40, position controller 44 and speed controller 45 for one or more of the inverters 9, 10, 11, 12 and output the required reference values to the inverters 9, 10, 11, 12 to control current supply to the rotor units.

Next, a self-commissioning routine of the linear motor is disclosed. In the self-commissioning routine, the constant parameters $a_{d0}$, $a_{dd}$, $a_{dq}$, $a_{q0}$, $a_{qq}$, $a_{dq}$, $b_{dm}$, $b_d$, $b_q$, $c_o$, $f_o$, $\psi_r$, S, T, U, V of the magnetic model 43 are identified by means of current excitation. The self-commissioning routine takes place during initiation of the motor drive, without need to operate the motor in an active closed-loop levitation control. During the self-commissioning routine, the mover is attached to the stator rail and rests standstill on the stator rail, such that air gap between stator and mover remains constant.

First, an excitation current $i_{dexc}$, $i_{qexc}$ is supplied with an inverter 9, 10, 11, 12 to the three-phase motor windings, and flux linkage $\psi_{dmeas}$, $\psi_{qmeas}$ caused by the excitation current is measured by means of the hall sensors 16A, 16B, 16C, 16D. Then this operation is repeated at N different operating points (N being at least two) with different excitation currents to gather fitting data pairs of excitation current—flux linkage ($i_{dexcN}$, $i_{qexcN}$; $\psi_{dmeasN}$, $\psi_{qmeasN}$) at different operating points. Number N of the data pairs/operating points ($i_{dexcN}$, $i_{qexcN}$; $\psi_{dmeasN}$, $\psi_{qmeasN}$) is selected such that number N is higher than the number of the constant parameters $a_{d0}$, $a_{dd}$, $a_{dq}$, $a_{q0}$, $a_{qq}$, $a_{dq}$, $b_{dm}$, $b_d$, $b_q$, $c_o$, $f_{94}$, $\psi_r$, S, T, U, V to be fitted in the magnetic model 43.

Flux linkages $\psi_d$, $\psi_q$ are also calculated from the magnetic model 43 (equations (1) and (2) above) by inputting to the magnetic model 43 currents equal to the currents of the corresponding fitting data pairs ($i_{dexcN}$, $i_{qexcN}$; $\psi_{dmeasN}$, $\psi_{qmeasN}$).

Then a well-known least-squares algorithm is used to fit the selected constant parameters $a_{d0}$, $a_{dd}$, $a_{dq}$, $a^{q0}$, $a_{qq}$, $a_{dq}$, $b_{dm}$, $b_d$, $b_q$, $c_o$, $f_o$, $\psi_r$, S, T, U, V in the magnetic model. This fitting is performed by minimizing the difference between the measured ($\psi_{dmeas}$, $\psi_{qmeas}$) and calculated ($\psi_d$, $\psi_q$) flux linkages. Thus, in the fitting algorithm the difference is calculated and the values of the selected constant parameters $a_{d0}$, $a_{dd}$, $a_{dq}$, $a_{q0}$, $a_{qq}$, $a_{dq}$, $b_{dm}$, $b_d$, $b_q$, $c_o$, $f_o$, $\psi_r$, S, T, U, V are changed such that the difference will be minimized. This way an accurate magnetic model 43 of the linear motor is achieved.

In some embodiments, the above-disclosed self-commissioning routine is also used for condition monitoring of the linear motor. Constant parameters of the magnetic model 43 are memorized in a non-volatile memory of the inverter 9, 10, 11, 12. Then new constant parameters $a_{d0}$, $a_{dd}$, $a_{dq}$, $a_{q0}$, $a_{qq}$, $a_{dq}$, $b_{dm}$, $b_d$, $b_q$, $c_o$, $f_o$, $\psi_r$, S, T, U, V are generated with the above-disclosed self-commissioning routine. The new constant parameters $a_{d0}$, $a_{dd}$, $a_{dq}$, $a_{q0}$, $a_{qq}$, $a_{dq}$, $b_{dm}$, $b_d$, $b_q$, $c_o$, $f_o$, $\psi_r$, S, T, U, V are also memorized in the non-volatile memory of the inverter. The new constant parameters are compared with the older ones. If change or rate of change between the new and the older constant parameters is not within allowable limits, an indication of possible degradation of the linear motor is signaled to a remote maintenance server to schedule corrective actions. The corrective actions may be performed before the linear motor has failed, thus ensuring continuous, uninterrupted operation of the linear motor.

In the preceding, self-commissioning routine has been discussed in connection with linear motor, using the magnetic model 43 of a linear motor. This self-commissioning routine is however applicable both to rotating and linear motors. In case of linear motor (as in FIGS. 2, 3 and 4), the mover is attached to the stator rail, such that air gap between stator and mover remains constant during commissioning. In case of rotating motor (as in FIGS. 1A and 1B), when the rotor is resting on safety bearings, the air gap is not constant but varies with the motor pole position. This variation may be compensated by representing the airgap as a function of motor pole position Y(x) instead of a constant airgap Y.

The invention can be carried out within the scope of the appended patent claims. Thus, the above-mentioned embodiments should not be understood as delimiting the invention.

The invention claimed is:

1. A method for self-commissioning a bearingless-motor drive, which includes a bearingless motor and a control unit of the bearingless motor, wherein the bearingless motor includes a stationary part and a movable part adapted to move relative to the stationary part, the motor including at least one winding, the method comprising:
generating a magnetic model, which represents a relationship between current, air gap length and flux linkage of the bearingless motor, the magnetic model comprising a plurality of constant parameters;
supplying, while the movable part remains standstill, to the at least one winding at least two unequal currents; and
measuring, with a magnetic sensor, flux linkages caused by said at least two unequal currents, respectively;
calculating, with the magnetic model, flux linkages by inputting to the magnetic model current values equal to the currents supplied to the at least one winding; and
fitting, with a least-squares fitting algorithm, at least one constant parameter in the magnetic model such that the difference between the measured and calculated flux linkages will be minimized.

2. A method for self-commissioning a bearingless-motor drive, which includes a bearingless motor and a control unit of the bearingless motor, wherein the bearingless motor includes a stationary part and a movable part adapted to move relative to the stationary part, the motor including at least one winding, the method comprising:
generating a magnetic model, which represents in a d, q coordinate system of the movable part a relationship between d-axis and q-axis current components, air gap length and d-axis and q-axis flux linkage components of the bearingless motor, the magnetic model comprising a plurality of constant parameters;
supplying, while the movable part remains standstill, to the at least one winding at least two unequal d-axis current components and/or at least two unequal q-axis current components;
measuring, with a magnetic sensor, d-axis and q-axis flux linkage components caused by said d-axis and q-axis current components, respectively;
calculating, with the magnetic model, d-axis and q-axis flux linkage components by inputting to the magnetic model d-axis and q-axis current component values equal to the d-axis and q-axis current components supplied to the at least one winding; and
fitting, with a least-squares fitting algorithm, at least one constant parameter in the magnetic model such that the difference between the measured and calculated d-axis and q-axis flux linkage components will be minimized.

3. A method for condition monitoring of a bearingless-motor drive, the method comprising:
generating a magnetic model, which represents a relationship between current, air gap length and flux linkage of the bearingless motor, the magnetic model comprising plurality of constant parameters;
memorizing said plurality of constant parameters;
supplying, to the at least one winding at least two unequal currents,
measuring, with a magnetic sensor, flux linkages caused by said at least two unequal currents, respectively;
calculating, with the magnetic model, flux linkages by inputting to the magnetic model current values equal to the currents supplied to the at least one winding;
fitting, with a least-squares fitting algorithm, at least one constant parameter in the magnetic model such that the difference between the measured and calculated flux linkages will be minimized;
comparing the fitted at least one constant parameter with the corresponding memorized parameter; and
establishing a service request of the bearingless-motor drive on the basis of the comparison.

4. The method according to claim 1, wherein the number of the unequal currents supplied to the at least one winding is higher than the number of the constant parameters to be fitted in the magnetic model.

5. A control unit for a bearingless-motor drive,
wherein the control unit comprises or can be connected to at least one current sensor and at least one magnetic sensor,
wherein the control unit is operable to feed current to the at least one winding of the bearingless motor, and
wherein the control unit comprises a processor and a memory including instructions which, when executed in the processor, cause the control unit to perform the method according to claim 1.

6. A bearingless-motor drive, which includes a bearingless motor and a control unit of the bearingless motor, wherein the bearingless motor includes a stationary part and a movable part adapted to move relative to the stationary part, the motor including at least one winding,
- wherein the bearingless-motor drive includes at least one current sensor and at least one magnetic sensor, which are connected to the control unit,
- wherein the control unit is adapted to feed current to the at least one winding of the bearingless motor, and
- wherein the control unit comprises a processor and a memory including instructions which, when executed in the processor, cause the control unit to perform the method according to claim 1.

7. The bearingless-motor drive according to claim 6 wherein the bearingless motor is a stator-mounted permanent magnet motor.

8. The bearingless-motor drive according to claim 6, wherein the stator-mounted permanent magnet motor is a linear motor.

9. An elevator comprising the bearingless-motor drive according to claim 6.

10. The method according to claim 2, wherein the number of the unequal currents supplied to the at least one winding is higher than the number of the constant parameters to be fitted in the magnetic model.

11. The method according to claim 3, wherein the number of the unequal currents supplied to the at least one winding is higher than the number of the constant parameters to be fitted in the magnetic model.

12. A control unit for a bearingless-motor drive,
- wherein the control unit comprises or can be connected to at least one current sensor and at least one magnetic sensor,
- wherein the control unit is operable to feed current to the at least one winding of the bearingless motor, and
- wherein the control unit comprises a processor and a memory including instructions which, when executed in the processor, cause the control unit to perform the method according to claim 2.

13. A control unit for a bearingless-motor drive,
- wherein the control unit comprises or can be connected to at least one current sensor and at least one magnetic sensor,
- wherein the control unit is operable to feed current to the at least one winding of the bearingless motor, and
- wherein the control unit comprises a processor and a memory including instructions which, when executed in the processor, cause the control unit to perform the method according to claim 3.

14. A control unit for a bearingless-motor drive,
- wherein the control unit comprises or can be connected to at least one current sensor and at least one magnetic sensor,
- wherein the control unit is operable to feed current to the at least one winding of the bearingless motor, and
- wherein the control unit comprises a processor and a memory including instructions which, when executed in the processor, cause the control unit to perform the method according to claim 4.

15. A bearingless-motor drive, which includes a bearingless motor and a control unit of the bearingless motor, wherein the bearingless motor includes a stationary part and a movable part adapted to move relative to the stationary part, the motor including at least one winding,
- wherein the bearingless-motor drive includes at least one current sensor and at least one magnetic sensor, which are connected to the control unit,
- wherein the control unit is adapted to feed current to the at least one winding of the bearingless motor, and
- wherein the control unit comprises a processor and a memory including instructions which, when executed in the processor, cause the control unit to perform the method according to claim 2.

16. A bearingless-motor drive, which includes a bearingless motor and a control unit of the bearingless motor, wherein the bearingless motor includes a stationary part and a movable part adapted to move relative to the stationary part, the motor including at least one winding,
- wherein the bearingless-motor drive includes at least one current sensor and at least one magnetic sensor, which are connected to the control unit,
- wherein the control unit is adapted to feed current to the at least one winding of the bearingless motor, and
- wherein the control unit comprises a processor and a memory including instructions which, when executed in the processor, cause the control unit to perform the method according to claim 3.

17. A bearingless-motor drive, which includes a bearingless motor and a control unit of the bearingless motor, wherein the bearingless motor includes a stationary part and a movable part adapted to move relative to the stationary part, the motor including at least one winding,
- wherein the bearingless-motor drive includes at least one current sensor and at least one magnetic sensor, which are connected to the control unit,
- wherein the control unit is adapted to feed current to the at least one winding of the bearingless motor, and
- wherein the control unit comprises a processor and a memory including instructions which, when executed in the processor, cause the control unit to perform the method according to claim 4.

18. The bearingless-motor drive according to claim 7, wherein the stator-mounted permanent magnet motor is a linear motor.

19. An elevator comprising the bearingless-motor drive according to claim 7.

20. An elevator comprising the bearingless-motor drive according to claim 8.

* * * * *